United States Patent [19]

Lipfert

[11] 4,348,594
[45] Sep. 7, 1982

[54] WIND POWER GENERATOR

[76] Inventor: Donald E. Lipfert, Box 142 River Rd., Woolwich, Me. 04579

[21] Appl. No.: 168,129

[22] Filed: Jul. 14, 1980

[51] Int. Cl.³ .............................................. F03D 5/06
[52] U.S. Cl. ................... 290/54; 73/861.37; 416/81; 310/25
[58] Field of Search ....................... 416/80, 82, 83, 79, 416/81, 37; 417/334; 290/54, 55; 137/826; 73/861.37; 310/800, 25

[56] References Cited

U.S. PATENT DOCUMENTS

| 757,800 | 4/1904 | Williams . |
| 1,312,021 | 8/1919 | Dickinson et al. . |
| 1,315,595 | 9/1919 | Clark . |
| 2,178,679 | 11/1939 | Claytor . |
| 2,542,522 | 2/1951 | Hings . |
| 2,895,063 | 7/1959 | Morris . |
| 3,273,389 | 9/1966 | Waugh ............................ 73/861.21 |
| 3,621,930 | 11/1971 | Dutchak . |
| 3,697,765 | 10/1972 | Carini . |
| 3,743,848 | 7/1973 | Strickland . |
| 3,793,530 | 2/1974 | Carter . |
| 3,799,205 | 3/1974 | Fisher et al. ......................... 137/826 |
| 4,024,409 | 5/1977 | Payne ..................................... 290/55 |
| 4,141,246 | 2/1979 | Randolph ........................ 73/861.21 |
| 4,164,382 | 8/1979 | Mysels .................................... 415/2 |

OTHER PUBLICATIONS

"Blowing Up More Killowatts from Wind", V. Torrey, Technology Review, pp. 12-13, (1980).
"Wind Machines", NSF report by Frank R. Eldridge, Grant No. AER-75-12937 (Oct. 1975).

Primary Examiner—J. D. Miller
Assistant Examiner—D. L. Rebsch
Attorney, Agent, or Firm—Pennie & Edmonds

[57] ABSTRACT

A wind power generator includes a flexible sheet or fabric supported under tension within a housing frame which guides an airflow therethrough and across the surfaces of the membrane. As the airflow passes over the surfaces, vortices are created which cause the membrane to vibrate. Energy conversion units are coupled to the membrane to tap the oscillatory motion and convert it into other useful energy forms, e.g., electrical, hydraulic or mechanical. Alternately, the membrane can be formed of a plurality of fabric strips which are connected to the energy conversion unit and are dimensioned in width equal to the pitch of the vortices. The distances between the strips preferably are also equal in dimension to the vortices' pitch.

16 Claims, 11 Drawing Figures

WIND POWER GENERATOR

TECHNICAL FIELD

This invention relates to an energy generating system and more particularly to a device for generating useful energy derived from an airflow.

BACKGROUND ART

The power of the wind is well known as a potential source of useful energy. This source of energy has become even more desirable in view of the ecology trend which spurns the polluting fossil-fueled methods of generating electricity. This is especially the case with coal which, in addition to the production of undesirable particulates, has been blamed for the creation of the devastating so-called acid rains. Moreover, the awareness that fossil-fuel energy sources such as oil are limited in supply and the even more recent awareness of the high cost of such fuels have resulted in a reawakening to the availability and desirability of wind power.

However, a problem exists in converting or transforming the power of the winds into other useful forms. Notably, apart from sailing ships which utilize the wind power to linearly drive the ship, the windmill has persisted as the most demonstrative example of utilizing the power of the winds. Most windmills have employed some form of rotary blades. Typically, the windmill consists of at least two symmetrically positioned aerodynamic propeller-like blades attached at one end to a shaft. The windmill blades rotate when subjected to a flowing air mass causing the shaft to rotate. A transmission mechanism is necessary to transfer the mechanical rotational energy to a work station or to convert it to a useful form.

However, the sweep area of rotary windmills greatly exceeds the effective area of the blades themselves. Moreover, since they must be oriented to face the wind, they must be capable of swiveling which not only complicates the mechanism required but also increses the cost thereof. Such swiveling further consumes a large amount of space. Also, because of the rather large size of the blades required to provide effective useful energy, rotary windmills generally must be mounted on towers or atop existing structures to effectively take advantage of higher wind velocities normally found well above ground. High elevation mounting is also required for safety reasons as well.

Rotary windmills are further limited in that they are generally designed to operate at low wind velocities which have a high incidence of occurrence. In view of this, it becomes necessary to provide automatic mechanisms capable of limiting the speeds of the blades at very high velocities to avoid possible damage. In addition, such rotary windmills are not self-starting at speeds below ten miles per hour and would accordingly provide little if any energy.

The swiveling required of a rotary windmill further complicates the support and power transmission mechanism typically including some type of bearing system which itself requires maintenance for proper operation. In addition to increasing the possibility of breakdown, such complexities increase the constructional and operational costs as well. In view of the rather large size required for commercially useful windmills, a breakdown would remove a sizeable source of power during that event.

DISCLOSURE OF THE INVENTION

I have invented an improved wind power generator which successfully avoids the above-mentioned disadvantages and limitations of known prior art devices.

According to the present invention, a device for generating energy derived from a moving fluid comprises housing means for guiding the moving fluid generally parallel to a predetermined direction, means disposed within the housing means for oscillating generally transversely to the predetermined direction in response to the movement of the fluid, and means coupled to the oscillating means for converting the oscillatory motion thereof into energy which is derived from the moving fluid.

In a preferred embodiment, a device for generating useful energy derived from an airflow comprises housing means for guiding the airflow in a predetermined direction therethrough, means disposed within the housing means for oscillating in response to the movement of the airflow through the housing means, the oscillatory motion being generally transverse to the predetermined direction, and means coupled to the oscillating means for converting the oscillatory motion thereof into useful energy which is dependent upon and derived from the energy of the airflow.

Preferably, the oscillating means comprises a generally flat flexible membrane supported within the housing means under tension. The membrane has at least one edge disposed so as to divide the airflow to pass over the surfaces of the membrane such that vortices are created which in turn cause the membrane to oscillate.

The housing means preferably includes a first and a second aperture each permitting passage of the airflow generally along the predetermined direction. Venturi vanes are disposed adjacent the first and the second apertures and configured so as to permit acceleration of the airflow passing into the housing means through either the first or the second aperture. Additionally, vanes can be positioned adjacent the venturi vanes so as to deflect airflows transverse to the predetermined direction through either the first or the second aperture.

The device can further include, if desired, an elongated, preferably cylindrical, member positioned generally parallel to and adjacent the edge of the membrane so as to create vortices of the airflow passing over the surfaces of the membrane. Also, the membrane can comprise a plurality of longitudinal strips mounted generally transversely to the predetermined direction. Preferably the strips are dimensioned in width and spaced apart approximately equal to the pitch of the vortices created.

The housing means may advantageously include means to adjust the tension of the membrane so as to provide for variation in the period of oscillation of the membrane.

The energy conversion means in a preferred embodiment of the present invention comprises at least one shaft having one end connected to a generally central portion of the membrane and at least one electrical conductor, preferably a coil of wire, disposed concentrically about the other end of the shaft. Means, e.g., a fixed or permanent magnet, are provided for generating a magnetic field adjacent the other end of the shaft such that upon movement of the shaft in accordance with the oscillatory motion of the membrane a voltage is induced across the electrical conductor.

Alternatively, the shaft of the conversion means can be coupled to a hydraulic pump or a mechanical transmission system capable of transferring the oscillatory motion of the membrane into either linear or rotary motion.

BRIEF DESCRIPTION OF DRAWINGS

The present invention is described in detail below with reference to the drawings in which.

BEST MODE FOR CARRYING OUT THE INVENTION

Figure 1:
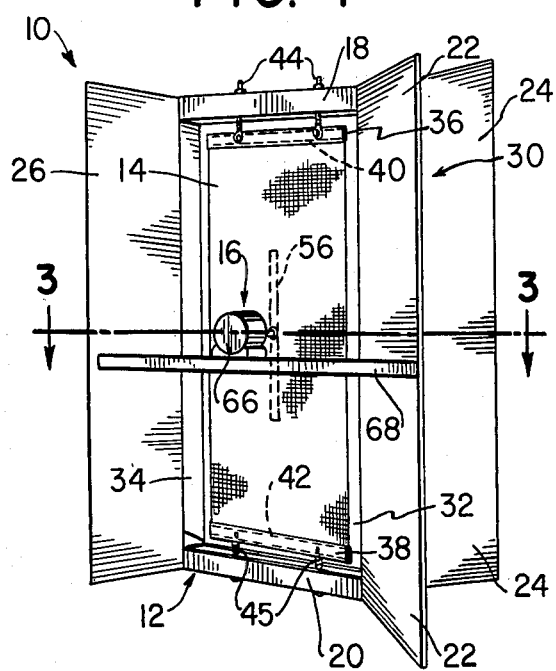
FIG. 1 is a perspective view of a wind power generator according to the present invention.

Referring to the drawings, a wind power generator 10 according to the present invention is illustrated as including a housing 12, a flexible membrane 14, and an energy conversion unit 16 for converting the energy inherent in a moving fluid into a useful form of energy.

Although reference is made herein to surfaces and orientations of various components of the wind power generator 10, such reference is simply for purposes of illustration and is not intended as a limitation of the wind power generator 10 according to the present invention.

Figure 2:
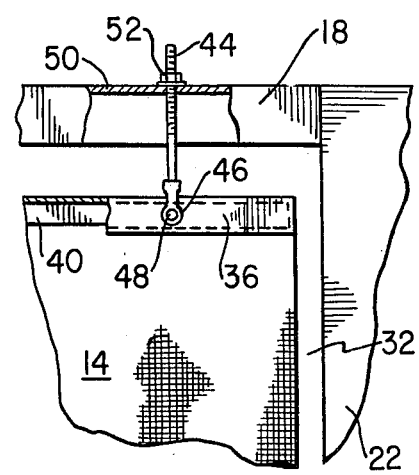
FIG. 2 is an enlarged partial view of FIG. 1 illustrating the attachment of an oscillating membrane to a housing frame.
Figure 3:
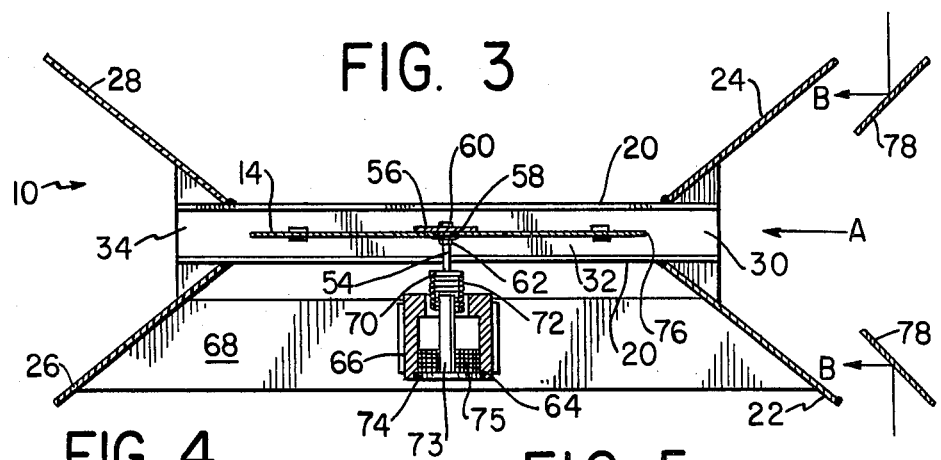
FIG. 3 is a cross-sectional view of FIG. 1 taken along line 3—3.

As shown in FIG. 1, the flexible membrane 14 according to a first embodiment of the present invention includes a thin, broad, and generally flat flexible fabric or sheet which is positioned between upper and lower crossbar members 18 and 20 respectively within the housing 12. Each crossbar member 18, 20 is constructed in the form of a generally U-shaped channel as shown more clearly in FIG. 2. At their respective ends, the crossbar members 18, 20 are joined by rectangular venturi-like panels or vanes 22, 24, 26 and 28 as shown in FIGS. 1 and 3. The pair of venturi-like panels, 22 and 24, form an aperture 30 into the central region 32 of the housing 12. Similarly, the panels 26 and 28 form an aperture 34. As will be more fully described below, each aperture 30, 34 permits the passage of an airflow through the central region 32 in a predetermined direction and thereby across the surfaces of membrane 14. In the event that the airflow passes through aperture 30, then aperture 34 serves as an outlet and vice versa.

The membrane 14 at its upper and lower edges 36, 38 respectively is formed by suitable means to enclose battens 40 and 42 respectively. The battens 40 and 42 provide for securing the membrane 14 within the central region 32 to the crossbar members 18, 20. Anchoring bolts 44 are secured at their respective one ends to the battens 40, 42 by eyelet 46 and rivet 48 as illustrated in FIG. 2. The other ends of the bolts 44 are threaded and pass through the central frame piece 50 of the respective crossbar member, e.g., 18 in FIG. 2. The bolt 44 is maintained in this position by nut 52 which also provides for an adjustment of the tension of membrane 14. This adjustment permits a variation in the frequency of vibration of the membrane 14. Similarly, batten 42 permits securement of the lower edge 38 of membrane 14 to the central frame piece of crossbar member 20. Preferably, the securement of lower edge 38 is achieved by means of resilient members, e.g., compression springs 45 as shown in FIG. 1. Alternatively, the bolts 44 securing the upper edge 36 to the housing 12 can be replaced with springs 45 or vice versa. In an alternative embodiment of the present invention, the membrane 14 is formed at its sides by suitable means to enclose only battens 41 and 43 as shown in FIG. 1. These battens 41 and 43 also permit the membrane 14 to be secured to the housing 12 by means of bolts 44 or springs 45 or combinations thereof in a manner similar to that described above.

The energy conversion unit 16 includes a shaft 54 passing through the membrane 14 and connected at one end to a coupling batten 56 secured to a central portion of the membrane 14 as shown in FIG. 1. The latter securement is provided, as illustrated in FIG. 3, by means of a back plate 58 which overlays coupling batten 56. The back plate 58 is maintained in contacting engagment with the coupling batten 56 by means of nuts 60 and 62 threaded on shaft 54 which also passes through the coupling batten 48 and the back plate 58. The shaft 54 at its other end is coupled to various arrangements as shown in FIGS. 3-8 depending on whether the useful energy output desired is electrical, hydraulic or mechanical.

An electrical output is provided by the energy conversion unit 16 illustrated in FIG. 3 wherein a fixed magnet 64 is supported on a base 66 and beam member 68 secured and positioned between panels 22 and 26. The shaft 54 includes at its other end a cylindrical form 70 having movable wire coils 72 wrapped concentrically about the cylindrical form 70. The fixed magnet 64 is adapted to receive the cylindrical form 70 in a sliding movement over support post 73. Both the fixed magnet 68 and support post 73 are secured to a back plate 74. An electromagnet 75 whose function will be more fully described below is positioned about support post 73 and also secured to back plate 74.

In operation, an airflow indicated by the arrow "A" in FIG. 3 is guided by means of the vanes 22 and 24 through aperture 30 into the central region 32 within the housing 12. In passing through the venturi-like panels 22 and 24, the airflow will be accelerated before passing through inlet 30 along the predetermined direction of the housing 12. This permits the wind power generator 10 to operate at very low speeds as well, an operation not available to known rotary windmills.

Upon entering the central region 32 the airflow will meet the forward leading edge 76 of the membrane 14. The leading edge 76 will divide the airflow to pass over the surfaces of the membrane 14. As the divided airflow passes along the surfaces, vortices are created which result in the creation of differential pressure regions along the membrane 14 surfaces in the predetermined direction. As a result, the membrane 14 will experience an oscillating or vibratory motion transverse to the predetermined direction which in turn by means of coupling batten 56 will be transmitted to the shaft 54 and coil arrangement 72. As the coil arrangement 72 passes through the magnetic field established by the fixed magnet 64, an electromotive force or induced voltage is created within the coil arrangement 72. Suitable electrical circuit connections (not shown) to the coil arrangement 72 will result in the creation of a current flow which may be directed to a work station either for immediate use or storage thereat.

In the event that the airflow is not generally parallel to the predetermined direction as indicated above by airflow arrow "A" but, e.g., is at right angles to the predetermined direction, vanes 78 positioned as indicated in FIG. 3 deflect such transverse airflow in the directions as indicated by the arrows "B". Similar vanes (not shown) can be positioned adjacent aperture 34 to deflect transverse airflows which might enter through aperture 34. In this manner, swiveling of the wind power generator 10 is totally eliminated and its operation can be made independent of its orientation relative to the airflow.

In the remaining FIGS. 4–11, similar structural and componental elements are identified by like numbers. Since these elements function are already described no further discussion in regard thereto is believed necessary.

Figure 4:
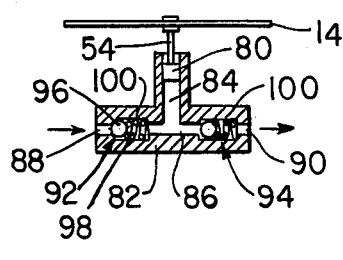
FIGS. 4-5 are alternative embodiments of a conversion device for generating hydraulic energy.
Figure 5:
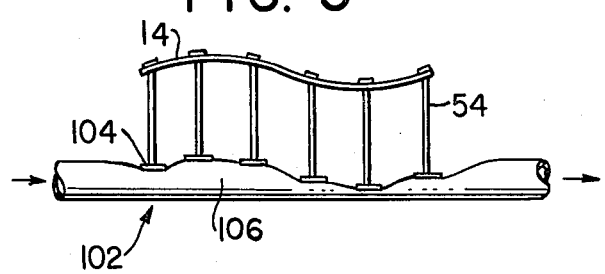
Figure 1A:
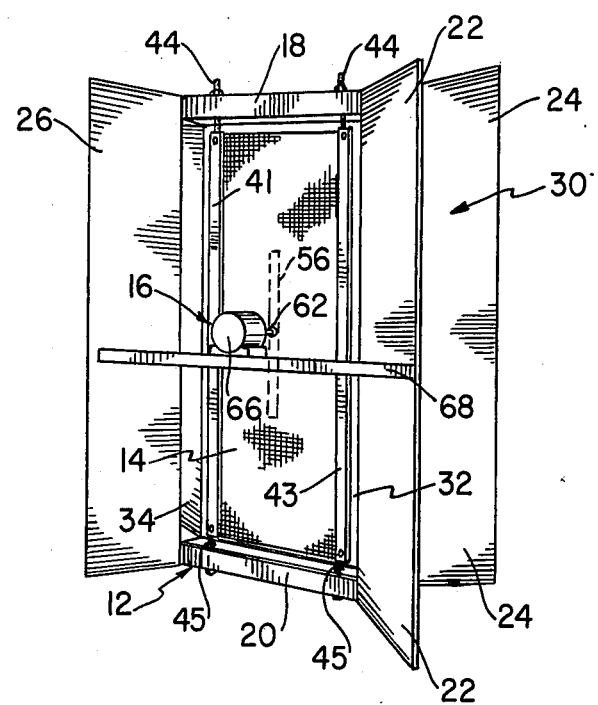

In FIGS. 4 and 5, the conversion units 16 are illustrated as pumps for converting the oscillatory motion of the membrane 14 into hydraulic energy.

According to FIG. 4, the shaft 54 at its other end is secured to a piston 80 slidably disposed within a hydraulic cylinder housing 82 defining a pistion chamber 84 containing hydraulic fluid. The housing 82 also includes a passageway 86 communicating with chamber 84 and having inlet 88 and outlet 90 for passage of a hydraulic fluid therethrough. Valves 92 and 94 each consisting of a typical ball 96 and spring 98 arrangement within seated portions 100 of passageway 86 regulate the direction of the flow of fluid.

As the piston 80 travels out of the cylinder housing 82, in accordance with the oscillatory motion of membrane 14, valve 94 closes, valve 92 opens and fluid is drawn into passageway 86. During the down stroke as the piston 80 travels into the cylinder housing 82, valve 92 closes, valve 94 opens and fluid is forced through outlet 90. In this manner, fluid can be pumped by means of the energy obtained from the oscillation of membrane 14 caused by the airflow across the surfaces thereof.

A second alternative hydraulic pump 102 is illustrated in FIG. 5 as including a plurality of shafts 54 each connected at their one ends to the membrane 14 in a linear fashion generally parallel to the direction of the airflow through the central region 32. At their other ends, each shaft 54 is secured to a flat plunger member 104 which is adapted to contact a flexible, resilient tube 106 through which a fluid passes. In this manner, the oscillatory pattern of the shafts 54 is imparted to the tube 106 such that fluid travels therethrough in the direction of the arrows as indicated. If desired, a one-way valve (not shown) can be employed to assure one-way flow.

Figure 6:
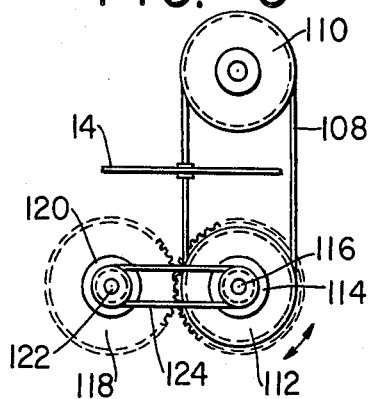
FIGS. 6-8 are alternative embodiments of the conversion device for generating mechanical energy.
Figure 7:
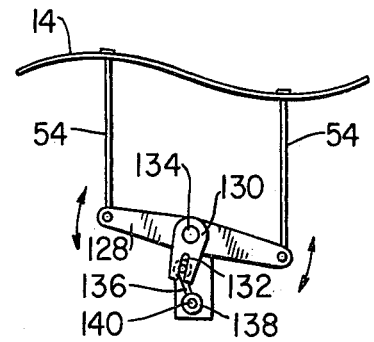
Figure 8:
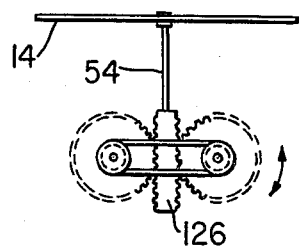

Referring to FIGS. 6–8, energy conversion units 16 are illustrated for transforming the oscillatory motion of the membrane 14 into rotary motions.

FIG. 6 illustrates one embodiment of a rotary motion drive which includes an endless cable or belt 108 secured at one point to the membrane 14 and positioned about pully 110 and a first drive gear 112. An overrunning clutch 114 secured to output shaft 116 and first drive gear 112 permits the output shaft 116 to continuously rotate only in a predetermined direction regardless of the reciprocating rotary motion of drive gear 112. A second drive gear 118 having an overrunning clutch 120 and output shaft 122 is coupled to the first drive gear 112 by means of a plurality of teeth along its periphery which coact with teeth on the periphery of first drive gear 112. The overrunning clutches are connected by a belt drive 124. In this manner, output shaft 122 provides a rotational output also only in the predetermined direction during those portions of the oscillations of membrane 14 when drive gear 112 is not causing output shaft 116 to rotate. Accordingly, the coupling of output shafts 116 and 122 by belt drive 124 assures that output shaft 116 will rotate continuously during the vibratory motion of membrane 14.

Similar to the energy conversion unit 16 shown in FIG. 6, that in FIG. 8 has a shaft 54 connected to the membrane 14 in place of the cable 108. The other end of a shaft 54 has a rack 126 which engages the teeth of dual drive gears similar in operation to those in FIG. 6 for which reason no further discussion is believed necessary.

Referring now to FIG. 7 the energy conversion unit 16 includes a pair of shafts 54 connected at their one ends to membrane 14 and at their other ends to opposite ends of rocker arm 128. A hub member 130 having a slot 132 is secured to the rocker arm 128 both of which pivot on shaft 134. An L-shaped linkage arm 136 having an end portion contained within slot 132 for sliding movement therein is connected at its other end portion to an overrunning clutch 138 which provides for a unidirectional rotation of output shaft 140.

Figure 9:
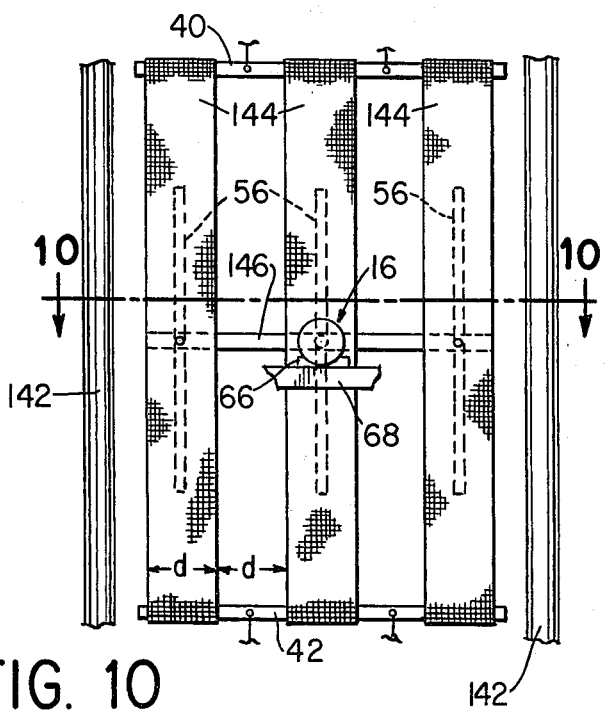
FIG. 9 is a partial frontal view of an alternative embodiment of the wind power generator according to the present invention.
Figure 10:
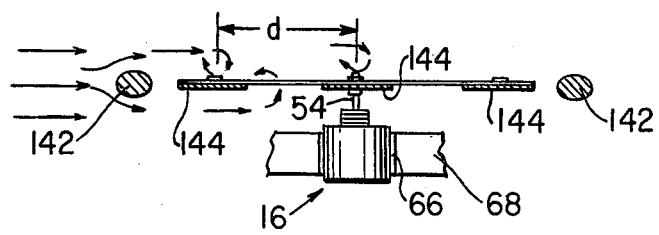
FIG. 10 is a cross-sectional view of FIG. 9 taken along line 10—10.

In the alternative embodiment shown in FIGS. 9 and 10, the vortices can be created by means of an elongated tubular, perferably cylindrical, member 142 which is positioned in front of and aligned with the leading forward edge of membrane 14. This permits the creation of a vortex pitch indicated by "d" in FIG. 10 which remains constant regardless of the speed of the airflow. Also, as shown in FIGS. 9 and 10, the membrane 14 can be constructed of a series of parallel rectangular bands or strips 144. Preferably, each strip 144 is equal in width to the distance between the vortices, i.e., the pitch, created by the tubular member 142. In addition, the strips 144 preferably are separated apart a distance also equal to the pitch of the vortices. This helps assure that each strip 144 will experience the maximum possible oscillation which in turn maximizes the energy output from the wind power generator 10.

In this embodiment, each strip 144 is secured by suitable means to battens 40 and 42. Also each strip 144 is secured to a coupling batten 56 each of which is secured to a coupling bar 146. The shaft 54 of conversion unit 16 is coupled at its one end to the coupling bar 146.

Figure 11:
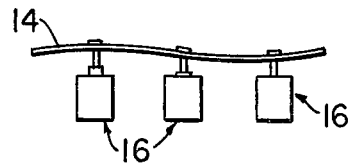
FIG. 11 is a top view of another alternative embodiment of a wind power generator according to the present invention.

As shown in FIG. 11, a plurality of energy conversion units 16 can be employed with a membrane 14 or strips 144. Moreover, it is possible according to the present invention to employ various combinations of energy conversion units 16 as described above so that the wind power generator 10 can provide any combinations of electrical, hydraulic or mechanical energy outputs.

In addition, any energy conversion unit 16 can be loaded so as to provide for maximum efficiency of operation in accordance with varying wind conditions and amplitudes. For example, in the case of the electrical energy conversion unit 16, the magnetic field flux density can be varied by use of the electromagnet 75 as shown in FIG. 3 or by varying the number of electrically active coils positioned on the end of shaft 54. In the case of the mechanical or hydraulic conversion unit 16, these can be loaded by varying the resistance offered against either the hydraulic or mechanical motions.

Regardless of the energy conversion unit 16 employed, the output energy can be transferred to a work station by suitable means (not shown) where the output energy can be utilized immediately or stored for a later use. In the case of the electrical conversion unit 16, the electrical energy can be carried by suitable electrical conductors to the work station, e.g., a home resistance heating unit such as a stove or a water heating system. Alternately, the electrical energy can be stored in batteries for later use.

Thus, the wind power generator 10 according to the present invention by not requiring the massive components typically needed in rotary windmills, avoids the physical limitations accompanying typical rotary windmills. For this reason, the wind powered generator 10 can be mounted in close proximity to the point of use, e.g., a home or other building, and may even be incorporated structurally for reduced cost of construction and aesthetic purposes.

In addition, since the wind powered generator 10 in essence has no wearing parts, friction losses are minimal. For this reason, and also because of the basic simple types of renewable materials which can be employed for construction, the cost as a function of the energy output is reduced as compared with a rotary windmill. Furthermore, unlike rotary windmills which must be designed as to size according to the intended usage and the locality of use, the wind power generator 10 can be constructed as a one size basic unit model which may be combined with additional similar units as needed, e.g., by clustering additional units so as to obtain larger outputs of useful energy. Furthermore, since the wind power generator 10 is totally independent of the orientation of the airflow, this feature not only permits use in various locations previously unsuitable for rotary windmills but also reduces the constructional and operational costs by avoiding the power and support transmission mechanisms typically required of rotary windmills.

Although the above description has been directed primarily to the use of a wind power generator 10 to derive useful energy from an airflow, the general features of the present invention are applicable as well to derive useful energy from other moving fluids such as a liquid. In such instances, the use of a flowing stream or tide can be employed to produce oscillation in the membrane or fabric according to the present invention.

I claim:

1. A device for generating energy derived from a moving fluid comprising:
   a. housing means for guiding the moving fluid generally parallel to a predetermined direction;
   b. means disposed within the housing means for oscillating generally transversely to the predetermined direction in response to the movement of the fluid, said oscillating means including a generally flat flexible membrane supported within the housing means under tension, said membrane positioned so as to have at least one edge disposed so as to divide the fluid flow to pass over the surfaces of said membrane such that vortices are created which cause said membrane to oscillate; and
   c. means coupled to at least a portion of the surface of said membrane for converting the oscillatory motion thereof into energy which is derived from the energy of the moving fluid.

2. A device for generating useful energy derived from an airflow comprising:
   a. housing means for guiding the airflow generally parallel to a predetermined direction therethrough;
   b. means disposed within the housing means for oscillating in response to the movement of the airflow through the housing means, the oscillatory motion being generally transverse to the predetermined direction, said oscillating means including a generally flat flexible membrane supported within the housing means under tension, said membrane positioned so as to have at least one edge disposed so as to divide the fluid flow to pass over the surfaces of said membrane such that vortices are created which cause the membrane to oscillate; and
   c. means coupled to at least a portion of the surface of said membrane for converting the oscillatory motion thereof into useful energy which is dependent upon and derived from the energy of the airflow.

3. A device for generating useful energy derived from an airflow comprising:
   a. housing means for guiding the airflow generally parallel to a predetermined direction therethrough;
   b. means disposed within the housing means for oscillating in response to the movement of the airflow through the housing means, the oscillatory motion being generally transverse to the predetermined direction, said oscillating means including a generally flat flexible membrane supported within the housing means under tension, said membrane positioned so as to have at least one edge disposed so as to divide the fluid flow to pass over the surfaces of said membrane such that vortices are created which cause the membrane to oscillate; and
   c. means coupled to said membrane for converting the oscillatory motion thereof into useful energy which is dependent upon and derived from the energy of the airflow;
   the housing means including:
   d. a first and a second aperture each permitting passage of the airflow generally along the predetermined direction; and
   e. venturi vanes disposed adjacent the first and the second aperture and configured so as to permit the acceleration of the airflow passing into the housing means through either the first or the second aperture;
   and further comprising an elongated member positioned generally parallel to and adjacent the edge of the membrane so as to create vortices of the airflow passing over the surfaces of the membrane.

4. The device according to claim 3 wherein the housing means includes:
   a. a first and a second aperture each permitting passage of the airflow generally along the predetermined direction; and
   b. venturi vanes disposed adjacent the first and the second aperture and configured so as to permit acceleration of the airflow passing into the housing means through either the first or the second aperture.

5. The device according to claim 3 wherein the elongated member is generally cylindrical.

6. The device according to claim 5 wherein the membrane comprises a plurality of longitudinal strips mounted generally transversely to the predetermined direction, the strips being dimensioned in width approximately equal to the pitch of the vortices created.

7. The device according to claim 6 wherein the housing means includes means to adjust the tension of the membrane so as to provide for variation in the period of oscillation of the membrane.

8. The device according to claims 4 or 6 wherein the conversion means comprises:
   a. at least one shaft having one end connected to a generally central portion of the membrane;
   b. at least one electrical conductor disposed concentrically about the other end of the shaft; and
   c. means for generating a magnetic field adjacent the other end of the shaft such that upon movement of the shaft in accordance with the oscillatory motion of the membrane an electromotive force is created within the electrical conductor.

9. The device according to claim 8 wherein the electrical conductor is a coil of wire.

10. The device according to claim 9 wherein the magnetic generating means includes a permanent magnet configured to receive the coil of wire therein so as to generate an electrical voltage within the coil of wire upon oscillation of the membrane.

11. The device according to claim 10 wherein the magnetic generating means further includes an electromagnet disposed within the permanent magnet and adapted so as to permit variation of the magnetic field flux density about the coil of wire and thereby load the conversion means.

12. The device according to claims 4 or 6 wherein the conversion means comprises:
   a. a shaft having one end connected to a generally central portion of the membrane;
   b. a piston connected to the other end of the shaft; and
   c. a hydraulic housing having a chamber capable of containing hydraulic fluid, the chamber being dimensioned and configured to slidably receive the piston therein such that upon movement of the shaft in accordance with the oscillatory motion of the membrane differential pressures can be created within the cylindrical portion of the hydraulic housing.

13. The device according to claim 12 wherein the hydraulic housing includes:
   a. a conduit for the passage of hydraulic fluid and communicating with the chamber;
   b. value means disposed within the conduit such that fluid flow is permitted only in one direction in accordance with the differential pressures created within the chamber.

14. The device according to claims 4 or 6 wherein the conversion means comprises:
   a. a flexible, resilient tubing for passage of a fluid, therethrough;
   b. a plurality of shafts each having one end secured to the membrane in a linear fashion generally along the predetermined direction, the other ends of the shafts each having a plunger member adapted to engage and compress the tubing such that upon the oscillation of the membrane the plunger members will undergo oscillatory motion capable of advancing fluid within the tube.

15. The device according to claims 4 or 6 wherein the conversion means comprises:
   a. means for transforming reciprocating rotary motion into unidirectional rotary motion; and
   b. means interconnecting the membrane and the transforming means so as to impart reciprocating rotary motion to the transforming means.

16. The device according to claim 15 wherein the transforming means comprises:
   a. overrunning clutch; and
   b. an output shaft axially connected to the overrunning clutch such that the output shaft will rotate in only one direction.

* * * * *